United States Patent [19]
Rink et al.

[11] Patent Number: 5,759,219
[45] Date of Patent: Jun. 2, 1998

[54] UNITARY DROP-IN AIRBAG FILTERS

[75] Inventors: Linda M. Rink, Liberty; Alan J. Ward, North Ogden; Harry W. Miller, II, Ogden, all of Utah

[73] Assignee: Morton International, Inc., Chicago, Ill.

[21] Appl. No.: 532,506

[22] Filed: Sep. 22, 1995

[51] Int. Cl.$^6$ ............................................. B01D 39/20
[52] U.S. Cl. ........................... 55/385.3; 55/486; 55/523; 55/527; 280/736; 280/740; 422/165; 422/305
[58] Field of Search .................... 55/385.3, 486, 55/487, 523, 525, 527, 522; 210/510.1, 503, 505; 95/273; 280/728.1, 736, 740, 741; 422/164, 165, 305

[56] References Cited

U.S. PATENT DOCUMENTS

| | | | |
|---|---|---|---|
| 2,995,088 | 8/1961 | Asplund | 102/202 |
| 3,241,681 | 3/1966 | Pall | 210/510.1 |
| 3,853,332 | 12/1974 | Lynch | 280/740 |
| 3,912,458 | 10/1975 | Fukuma et al. | 422/164 |
| 3,950,263 | 4/1976 | Fukuma et al. | 252/193 |
| 4,012,211 | 3/1977 | Goetz | 280/741 |
| 4,017,100 | 4/1977 | Gehrig et al. | 280/736 |
| 4,265,659 | 5/1981 | Blome | 75/407 |
| 4,316,874 | 2/1982 | Kasama et al. | 422/126 |
| 4,568,595 | 2/1986 | Morris | 428/116 |
| 4,629,483 | 12/1986 | Stanton | 55/487 |
| 4,662,915 | 5/1987 | Shirai et al. | 55/523 |
| 4,732,594 | 3/1988 | Mizrah et al. | 55/523 |
| 4,846,906 | 7/1989 | Helferich | 156/89 |
| 4,865,635 | 9/1989 | Cuevas | 55/276 |
| 4,965,101 | 10/1990 | Frei et al. | 427/255 |
| 4,976,760 | 12/1990 | Helferich et al. | 55/487 |
| 5,000,479 | 3/1991 | Werner et al. | 280/736 |
| 5,064,459 | 11/1991 | Unterforsthuber | 55/512 |
| 5,071,457 | 12/1991 | Schmidt, Jr. | 55/523 |
| 5,075,160 | 12/1991 | Stinton et al. | 428/282 |
| 5,098,571 | 3/1992 | Maebashi | 210/501.1 |
| 5,100,171 | 3/1992 | Faigle et al. | 280/741 |
| 5,196,120 | 3/1993 | White | 210/504 |
| 5,204,068 | 4/1993 | O'Loughlin | 422/180 |
| 5,215,721 | 6/1993 | Tasaki et al. | 422/165 |
| 5,230,726 | 7/1993 | Smith et al. | 55/487 |
| 5,266,279 | 11/1993 | Haerle | 55/523 |
| 5,268,013 | 12/1993 | Bruncher et al. | 422/164 |
| 5,308,370 | 5/1994 | Kraft et al. | 280/736 |
| 5,346,254 | 9/1994 | Esterberg | 280/741 |
| 5,351,619 | 10/1994 | Chan et al. | 102/289 |
| 5,364,586 | 11/1994 | Trusov et al. | 419/2 |
| 5,368,329 | 11/1994 | Hock et al. | 280/741 |
| 5,372,380 | 12/1994 | Duffy et al. | 280/740 |
| 5,374,407 | 12/1994 | Decker et al. | 422/305 |
| 5,464,249 | 11/1995 | Lauritzen et al. | 280/741 |
| 5,466,420 | 11/1995 | Parker et al. | 280/740 |
| 5,494,506 | 2/1996 | Ford et al. | 55/527 |
| 5,503,806 | 4/1996 | Fulmer et al. | 280/740 |
| 5,505,488 | 4/1996 | Allard | 280/741 |
| 5,547,638 | 8/1996 | Rink et al. | 422/164 |

FOREIGN PATENT DOCUMENTS

| | | | |
|---|---|---|---|
| 370734 | 5/1990 | European Pat. Off. | 280/736 |
| 0626295 | 11/1994 | European Pat. Off. | |
| 0640515 | 3/1995 | European Pat. Off. | |
| 50-48797 | 5/1975 | Japan . | |
| 4-2542 | 1/1992 | Japan | 280/736 |
| 1632484 | 3/1991 | U.S.S.R. | |
| 9427842 | 12/1994 | WIPO . | |
| 9608302 | 3/1996 | WIPO . | |
| 9610453 | 4/1996 | WIPO . | |

OTHER PUBLICATIONS

U.S. Serial No. 08/586,044, filed Jan. 16, 1996, entitled Reinforced Ceramic Airbag Filters.

*Primary Examiner*—Duane S. Smith
*Attorney, Agent, or Firm*—Taylor J. Ross; Gerald K. White

[57] ABSTRACT

Unitary filters for airbags. The filters may be formed from various combinations of ceramic grit, ceramic fiber, metal grit, metal fiber, and non-metal fibers. Combinations of disparate particle sizes may be used to increase filter diffusion and reduce the size of particles filtered. The disparate size particles may be uniformly mixed, or may be in relatively discrete layers. Fibers may be used to increase the strength of the filter. The fibers may be mixed with an initial slurry, or the slurry may be pressed into a mat of the fibers.

17 Claims, 2 Drawing Sheets

UNITARY DROP-IN AIRBAG FILTERS

BACKGROUND OF THE INVENTION

1. Field of the Invention

The present invention relates in general to filters for pyrotechnic airbag restraint modules. In particular, the present invention relates to improved unitary, monolithic filters for such modules.

2. Description of the Related Art

Pyrotechnic airbag restraint modules are well known, and generally include an inflator connected to a cushion. The cushion is inflated by generation of gas by a material stored within the inflator housing. With most commonly used gas generant materials, however, an undesirable amount of solids are produced during gas generation, and as such a filter is provided within the housing to reduce the solids to an acceptable level.

While various shapes and sizes of filters are known, two of the most common filter shapes are referred to as disk and tubular herein. The disk filters are planar elements with a circular periphery, and are commonly employed in axial flow inflators. The second type, tubular, take the form of a length of hollow tube. Both of these filters have typically been formed of multiple layers of various filtering materials such as wire mesh and ceramic paper.

Such multi-layer filters are difficult and expensive to produce and install, especially in the case of tubular filters. To avoid these disadvantages, there have been various attempts to provide an airbag filter in the form of a unitary element which may be easily mass produced and easily installed in the housing. Unitary filters must of course withstand the intense heat and pressure associated with a pyrotechnic airbag. To withstand the heat, it has been proposed to form a filter from agglomerated ceramic particles or grit. An example of this is shown in Japanese Kokai 50-48797, published May 01, 1975.

These ceramic filters are very heat resistant, and are also very strong in compression. However, they are quite weak in tension. As such, ceramics are useful for the disk filters which are placed almost entirely in compression, but are not suited to tubular filters, where large hoop stresses are generated.

Various other exotic materials have been proposed, such as reticulated carbon foam with a metallic coating, as shown in U.S. Pat. No. 5,372,380 to Duffy et al. While such materials may provide the desired heat and pressure resistance, they are expensive to produce.

SUMMARY OF THE INVENTION

An object of the present invention is to provide a filter for an airbag which is simple and inexpensive to produce, and easy to install.

Another object of the present invention is to provide such a filter which will withstand the heat and pressure of airbag activation, while providing the desired filtering.

A further object of the present invention is to provide a filter material with sufficient strength that it may be employed as the exterior housing for the inflator.

These and other objects are achieved by unitary filters for airbags. The filters may be formed from various combinations of ceramic grit, ceramic fiber, metal grit, metal fiber, and non-metal fibers. Combinations of disparate particle sizes may be used to increase filter diffusion and reduce the size of particles filtered. The disparate size particles may be uniformly mixed, or may be in relatively discrete layers. Fibers may be used to increase the strength of the filter. The fibers may be mixed with an initial slurry, or the slurry may be pressed into a mat of the fibers.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

The present invention is primarily concerned with the constituents and formulations for unitary filters for airbags and other pyrotechnic inflation devices. In general, these constituents will be in the form of small particles which are molded or formed into the desired final shape. To better describe the invention, therefore, a few of the more common final shapes for filters are initially noted.

Figure 1:
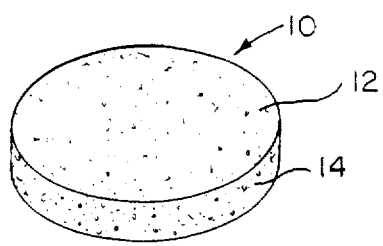
FIG. 1 is a perspective view of a disk filter according to the present invention.

With reference to FIG. 1, a disk filter according to the present invention is generally designated by reference numeral 10. The filter 10 is appropriately in the form of a disk, with circular upper and lower faces 12 and a peripheral sidewall 14. Disk filters are typically employed in driver side airbag inflators having a cylindrical shape, generally similar to that shown in FIG. 4. The disk filter 10 will typically be placed within the cylindrical housing between the pyrotechnic gas generant and the outer top wall of the housing to thus filter the gas prior to exiting the inflator. In many cases the inflator will be of the axial flow type, with the gas exiting the inflator along its longitudinal axis through the top wall.

Figure 2:
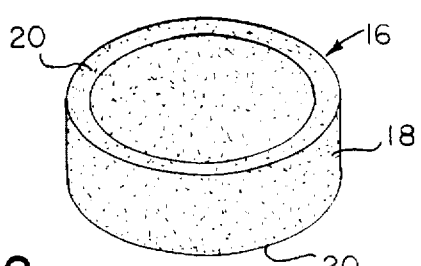
FIG. 2 is a perspective view of a tubular filter according to the present invention.

A second common filter type, a tubular filter, is shown in FIG. 2, and is designated by reference numeral 16. The tubular filter takes the form of a section of a tube, with a sidewall 18 bounded by longitudinal ends 20. The tubular filter is commonly used in both driver side and passenger side inflators. Passenger side inflators are, like driver side inflators, generally cylindrical, though typically much longer, as exemplified by FIG. 3. The tubular filter of FIG. 2 may be used in either type of inflator with the most apparent difference in the filters being only the length. In either case the filters are disposed between the generant and the outer peripheral sidewall, with the sidewall often having the exit ports therein.

Figure 3:
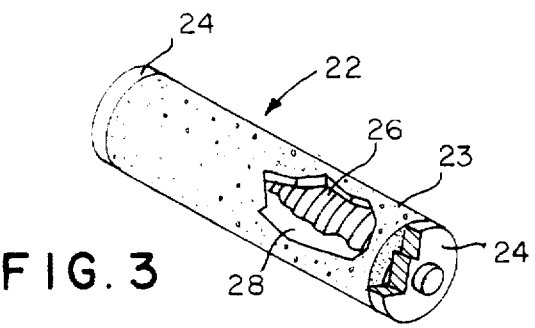
FIG. 3 is a perspective view with cut-away of a passenger side inflator formed with a filter housing according to the present invention.

With reference to FIG. 3, a passenger side inflator 22 is shown, which includes a tubular filter housing 23. The filter housing is generally similar to the tubular filter, and includes the sidewall and longitudinal ends, but is designed to actually form at least a portion of the outer sidewall of the housing, with the ends being closed by appropriate end caps 24. Although not shown in the drawings, one or both of the circular end caps could be replaced by a monolithic extension of the filter housing. As may be seen, the passenger side inflator includes a mass of gas generant 26 within the housing, in this case formed as a plurality of wafers. As the housing is formed at least in part by the permeable filter housing 23, the generant is provided with a surrounding moisture barrier layer 28 in the form of a plastic or similar bag.

Figure 4:
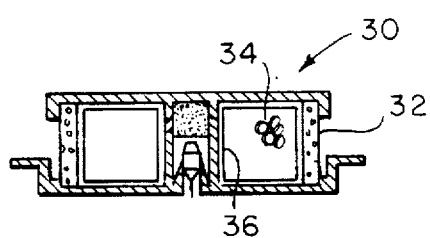
FIG. 4 is a cross-sectional view of a driver side inflator formed with a filter housing according to the present invention.

A variant of this arrangement is shown in a driver side inflator 30 shown in FIG. 4. In this inflator, as in FIG. 3, the sidewall is formed by a tubular filter housing 32. In this arrangement, however, the length of the tube is much less, in keeping with common driver side inflator design. As with the previous embodiment, the inflator will include a generant 34 (often in the form of tablets), which is again sealed within a barrier layer 36.

While these various examples of final filter forms or shapes have been specifically, shown, it should be understood that the materials set forth below may be shaped into other arrangements suitable for pyrotechnic inflation devices, and still remain within the scope of this invention.

The particular constituents of the present filters will now be discussed in greater detail. As noted above, the materials are typically in the form of small particles, but certain embodiments envision the use of short fibers, either in loose form or assembled in the form of a mat, a felt, or a paper. Certain other embodiments also envision the use of fibers formed into more traditional woven cloth.

The basic materials envisioned in the invention for these particles and fibers are ceramics, metals, and non-metals. While this appears extremely broad, these terms, as used herein, are limited to those materials which, at least in their final form, may withstand the temperatures and pressures associated with a pyrotechnic inflation device, at least to the degree needed to maintain their function during the duration of the inflation. Such temperatures are often in the range of 1,500° to 3,000° F., although these are essentially instantaneous temperatures and the duration of the inflation typically will last less than one second.

The pressures within a pyrotechnic inflator may reach 1,500 to 4,000 psi during this period. While the pressure is extreme, it is not necessarily required that the individual material (e.g., silicon dioxide or stainless steel) be capable of withstanding such a pressure during the noted high temperature. This is because the individual material under consideration may be mixed with other diverse materials which add to the strength or other properties to a sufficient extent to permit the use of otherwise unsuitable materials. As such, temperature resistance alone is considered a more accurate initial predictor for limiting the noted terms.

Even with the short time duration, the extreme temperatures limit the available materials which fall within the meanings of the terms ceramic, metal and non-metal. For ceramics, this limitation is not so great due to the well known thermal properties of most ceramics. While many ceramics may thus qualify for use, there are certain ceramics which are better suited due to their sintering temperatures, cost, material properties, etc. Preferred ceramics include silicon dioxide, silicon carbide and aluminum oxide.

The temperature requirements serve to provide greater limitations upon the term "metals", as not all metals will withstand these temperatures without melting. Preferred metals are stainless steel, carbon steel, and iron. While other rare metals may be employed, they would typically not be used due to their high cost.

The temperature requirements cause the greatest limitation upon the term "non-metal". For example, the vast majority of natural and synthetic fibers, such as cotton or polyester, would not survive the high temperatures, and thus would not be included in the term "non-metal" as used herein. Preferred materials which may withstand the activation temperatures (and the sintering temperatures described below) are alumina, carbon, graphite, Kevlar®, and combinations of the above. Also as before, more exotic fibers may be employed, but would not be feasible in mass production due to cost.

The materials used in the ceramic and metal particles and fibers, and non-metallic fibers, have now been identified. At this point it is proper to indicate in further detail what is means by the terms particles and fibers.

The term "particles" or "grit" is meant to encompass small pieces of material on the general order of a grain of sand. Particular sizes will be noted below for particular embodiments. In the present invention, unless specifically indicated, designating a physical size is intended to refer to particles having that particular size, and some amount of slight variance therefrom, such as 5–10%.

The definitions above for particles and grit apply to both the ceramics and the metals.

The term "fibers" is intended to include elongated pieces of the materials. These fibers will typically, though not necessarily, be circular in cross-section, and as such will be referenced below by diameter sizes. The length of the fibers will vary, and are identified below for particular embodiments. As with particle size ranges, the indication of a fiber diameter and length is intended to identify fibers having those particular sizes, plus or minus about 10%, unless otherwise indicated.

The fibers may be provided in various forms, also. One form is simply loose fibers, meaning a plurality of fibers which are not associated into any structure. The fibers may also be associated into a structure. For example, the fibers may be bound into a mat form by known processes. This mat may be quite loose, in a manner similar to fiberglass insulation. The mat form may also be more compacted, such that the fibers take on the appearance of a felt. In either case appropriate stitching to maintain the mat form may is be provided. An even more compacted form of fiber mat may take on an appearance similar to a paper, in a manner similar to known ceramic paper. Finally, the fibers may be formed into a more traditional cloth arrangement, with a warp and weave. In such fabrics the particular number of fibers per unit area in each direction may vary from a very loose weave similar to a netting, to a tight weave similar to textile cloth.

The definitions above for fibers, mats, and cloths apply to each of ceramics, metals and non-metals. In addition to the above requirements for strength and temperature resistance, the filters must of course be porous. In this regard it is noted that preferred porosities are within the range of 10–120 CFM/sq. ft. of filter surface area at a pressure of ½" of water. A preferred range for non-azide gas generants is 60–70 CFM/sq. ft. of filter surface area at a pressure of ½" of water.

Having identified what is meant by the various constituents of the inventive embodiments, particular filter formulations will now be described.

A first embodiment of a filter according to the present invention employs only ceramic grit. As noted above, unitary filters of ceramic grit have been known in the art. A prior art ceramic filter is illustrated in the greatly magnified view of FIG. 5. Such a prior art filter is formed as a unified agglomeration of particles 38. A mass of these particles are formed together into the form of the filter (i.e., disk, etc.) by pressing, to form a preform or green. This green will retain the shape due to deformation of the particles, or due to the action of a binder previously added to the mass of particles. Thereafter, this green is calcined or sintered to complete its production.

As may be envisioned, the most compact and dense form for spherical particles 38 would be a series of layers of particles, with each layer forming a perfect grid. Alternate layers would be slightly offset, to permit the particles of the upper layer to rest in the depressions formed between the particles of the lower level. The interstitial spaces between particles would be small in this arrangement, and would provide the optimum filtering due to their small size. Furthermore, the size of the interstitial spaces would be proportionally smaller with smaller particle sizes.

Unfortunately, it is essentially impossible to cause actual particles of this size to take their most compact form. This is due in part to the inability to apply sufficient pressure, and the "stickiness" of the particles in a slurry with a binder. A further factor is small variations in particle size and shape. The latter may be the most important, as some materials are not economically feasible in spherical form, but are feasible in irregular "chips" having very angular forms.

Figure 5:
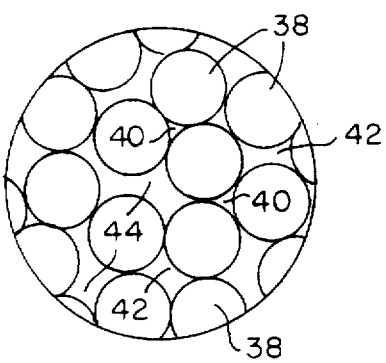
FIG. 5 is an enlarged detail representation of a prior art particle configuration.

In practice, therefore, the particles will take a more random arrangement represented in FIG. 5 (keeping in mind that the two-dimensional representation would extend in the third dimension also). With this more random arrangement, certain sets or clots of particles will be in close contact, and will provide small air paths 40 therebetween. However, not all adjacent particles will be in actual contact. As such, voids 42 are formed within the filter material. In keeping with the random nature of the particle positions, some of the voids are larger than others.

Additionally, some of the voids 42 are in sufficient three-dimensional communication to create a number of passageways 44 through the filter which are much larger than the average. These large passageways are of course preferred by the generated gas, as they offer less resistance. However, these large passageways also permit the passage of larger solids suspended within the gas, thus reducing filtration. Reducing the size of the grit particles may provide some reduction in this problem by proportionally reducing the size of the voids and passageways. However, the cost of grit increases with reduced particles size, so that a sufficiently small grit size may be economically untenable.

In this first embodiment of the present invention, this problem is avoided or reduced by employing at least two disparate grit sizes to increase the effectiveness of the filter.

In a first arrangement, two ceramic grit sizes are mixed uniformly, typically with an appropriate and known binder, in a manner similar to that used in the prior art for a single grit size. This mixture, having a consistency similar to wet sand, is then molded to a form at least approximating the final desired shape. This may be effected by extrusion of the mixture, isostatic compression, or pressing in a mold or form, to produce a preform or green. The green is treated (as by the simple drying, calcining and/or sintering) to produce the solid, strong unitary filter. If necessary, machining to size may be performed as a final step.

Figure 6:
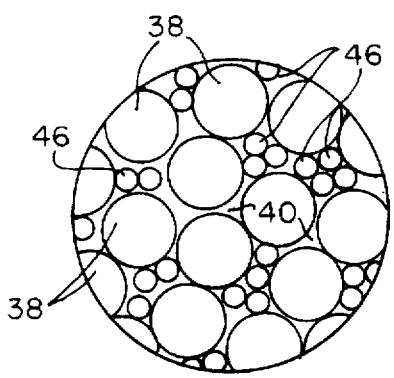
FIG. 6 is an enlarged detail representation of a large/small particle configuration according to the present invention.

Within this first arrangement, there are two examples shown. In the example of FIG. 6, the grit sizes may be characterized as large grits 38 and small grits 46, respectively, with the large grit 38 being from about 0.053–0.028" (1.35–0.70 mm, or 10–25 mesh), and the small grit 46 being about one-third to one half the size of the large grit, or about 0.030–0.012" (0.75–0.30 mm, or 20–50 mesh). It is noted that, even though the noted ranges overlap, it is not envisioned that the large and small particles used would be of approximately the same size. Rather, it is intended that the difference in particle size be appreciable, and at least on the order of 1:1.5, and preferably about a 2:1 ratio. These two different grit sizes may be mixed in proportions between about 1:1–1:10 small to large particles by weight. As may be seen, the small grit serves to fill the void areas between the large grit, reducing the size of any large passages through the filter, thus increasing filtration of solids.

Figure 7:
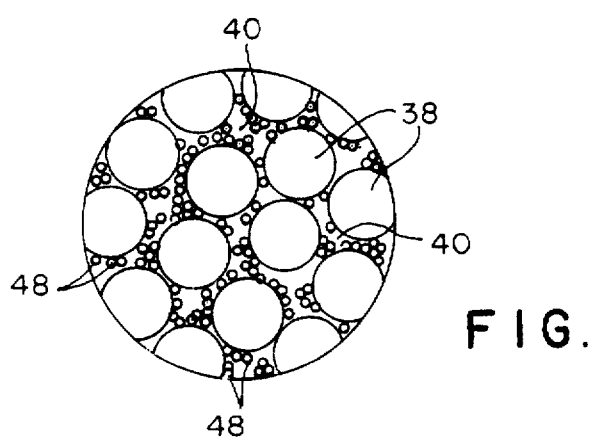
FIG. 7 is an enlarged detail representation of a large/vary small particle configuration according to the present invention.

The second example is shown in FIG. 7, where the grit sizes may be characterized as large grit 38 and very small grit 48, respectively. In this example the large grit may again have a size within the range of about 0.053–0.028" (1.35–0.70 mm, or 10–25 mesh), though the very small grit 48 has a size in the range of about 0.0029–0.0014" (0.075–0.035mm, or 200–400 mesh). With this example the two grit sizes may be mixed in a proportion between about 1:2–1:5 very small to large particles by weight.

In both of the examples of FIGS. 6 and 7, the smaller sized grit at least fills the passageways 44, and reduces the size of the voids 42, thus reducing the size of a solid object which may pass through the filter. A thorough mixture of the two grit sizes may result in the smaller grit being sufficiently pervasive that the paths 40 between the large grit are virtually nonexistent. At a minimum, the number and size of the paths should be reduced.

Additionally, the individual particles are believed to have more intimate connections with each of the other particles. In particular, the presence of the smaller particles 46 or 48 within the voids and passageways results in more connections with (and thereby between) the large grit 38. The increased number of connections between particles is believed to increase the strength of the unitary filter.

Finally, the mixture of the two grit sizes permits the use of less expensive large particles 38. As such, the mixture of grit sizes is believed to provide adequate filtering at a cost appreciably less than that for a filter formed entirely of a smaller grit.

Figure 8:
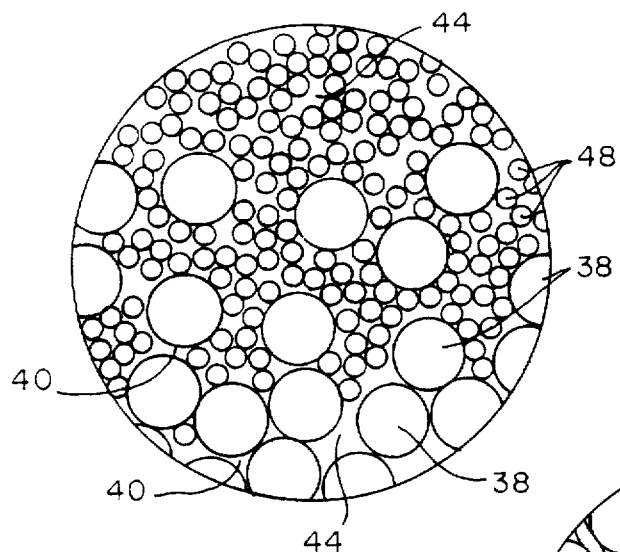
FIG. 8 is an enlarged detail representation of a layered large/small particle configuration according to the present invention.

A second arrangement in this first embodiment is to provide the disparate grit sizes, yet in a more layered manner, as illustrated in FIG. 8. With this arrangement, the grit sizes are not uniformly mixed, but are kept separate initially. Each of the grit sizes 38 and 46 (and/or 48) is then subjected to the forming process described above to form a green, but of a reduced thickness such that each green will form a layer of the completed filter. These layers will of course extend in the direction of gas flow through the filter.

Once the green layers have been formed, they may be assembled together within a mold and pressed or compressed together to unite the greens. This may be facilitated by reducing the amount of pressure applied to initially form the individual green layers, compared to a single forming step as described above, such that they may be further compacted during this second step. It is preferred that all layers of the filter be assembled at the same time in this second compacting step, but an individual layer or layers may be pressed into position separately. This second pressing or compacting step forces the disparate layers together sufficiently that they will be secured together.

In a manner similar to a single grit-size filter discussed above, each of the layers, being formed of a single grit size, will include voids and passageways. These will be sufficiently small in the smaller-grit layer(s) that they will not cause a problem. However, the large grit layer(s) may experience undesirable channeling of the gas flow as noted previously.

The pressing or compacting to form the unitary filter will, however, cause some amount of intermingling of grit sizes across the boundary between adjacent layers. This intermingling will produce a transition zone of mixed size grit, similar to the uniformly mixed grit sizes discussed above. This transition zone will thus have greatly reduced voids and passageways. As a result, the gas flow from the large grit layer will be diffused before entering the smaller grit layer(s) downstream. This will improve filtering, as a more even flow will be filtered by the smaller grit layer(s).

As may be envisioned, the final filter form must fit within the inflator, and as such the thickness of the layers depends upon such final size. The number of layers, and their order, however, may be varied for best results in a particular application. For example, moving from the upstream to downstream direction of gas flow, there may be provided a large grit layer and a small grit layer, or a small grit layer, a large grit layer and a very small grit layer. Other combinations are of course possible.

The benefits of using multiple grit sizes are not limited to ceramics. In particular, metal particles may also be used in essentially identical manners as described above. The only differences would be the possible deletion of the binder, as metal particles may be forced into a green simply by application of sufficient pressure, if desired, and the temperatures required to sinter the green would be reduced to known metal sintering temperatures. All other factors, including particle sizes, and mixture percentages, are essentially identical.

As with ceramic, this use of plural grit sizes permits efficient filtering with reduced cost. This is especially true for metals, as smaller particle sizes are quite expensive. The ability to use larger metal grit size, therefore, is believed to provide quite appreciable cost savings.

It is also possible, and likely preferred, to mix the metal and the ceramic particles. For example, large metal particles 38 could be combined with small ceramic particles 46 or very small ceramic particles 48. This combination could be by uniform mixing prior to forming a green. The formation of the green could be achieved without binder so long as there is a sufficient quantity of the metal particles to ensure adequate deformation to maintain the shape of the green. In this regard, it is noted that suitable mixture percentages are between about 5/95% to 95/5% of metal/ceramic, with percentages at the higher end of metal concentration being most suitable to forming greens without a binder.

The green would then be sintered at metal temperatures. This temperature is of course well below typical ceramic sintering temperatures, but all that is required is that the metal particles bond sufficiently to each other to capture or bind the ceramic particles, in a manner quite similar to FIG. 6. It is mainly for this reason that it is preferred that the metal particles be larger than the ceramic particles. In particular, the larger particles tend to have the more continuous lattice of contact points, and as such would provide the strongest framework upon sintering. A sufficiently high concentration of metal particles may, however, permit the use of smaller metal particle sizes.

Another reason for the preference of larger metal particles is cost. As a general rule, ceramic particles are less expensive than metal, and larger particles of either material are less expensive than smaller. As such, the preferred arrangement of large metal particles and small ceramic provides the lowest cost. This cost will typically be appreciably lower than using entirely metal particles. The cost will, however, typically be higher than using entirely ceramic particles. This cost difference will likely be offset by increased strength compared to entirely ceramic particles, and possibly also by reduced manufacturing costs due to the lower sintering temperatures.

In this arrangement there is the possibility that not all of the ceramic particles will be held securely in position between metal particles, but would be loosely held within the filter. At a minimum, this could cause a slight rattle, which is of course to be avoided. At worst, the loose particles would not be securely retained, and would be blown from the filter upon application of pressure. Such a discharge of particulate from the filter is of course the opposite of what is desired from the filter. To prevent this, the amount of metal particles may be increased, and/or the filter may be subjected to an initial pressure application prior to use in the inflator, ejecting all loose particles.

Figure 9:
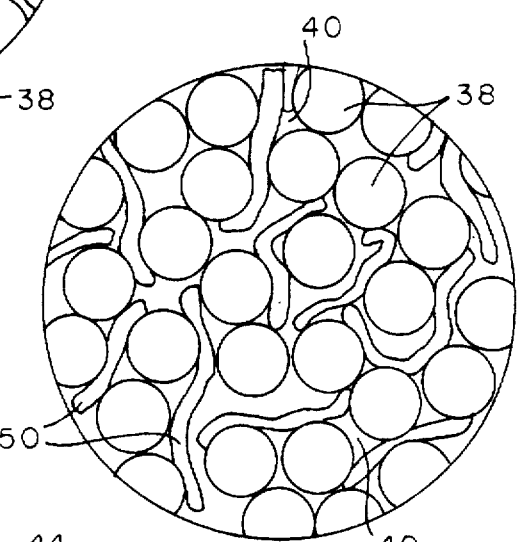
FIG. 9 is an enlarged detail representation of a particle/fiber configuration according to the present invention.

One method to avoid the problems of loose ceramic particles is to employ fibers instead. In this embodiment, illustrated in FIG. 9, fibers 50 are shown extending through the particles 38. As should be apparent, the length of the fibers 50 helps to ensure that the fibers will be bound by the sintered particles 38, simply by increasing the number of particles with which the fiber comes into contact. This in turn increases the probability that the fiber will be fixed by a pair of sintered particles 38.

The length of the fibers 50 will preferably be no less than approximately 0.028", with no end on the upper limit for fiber lengths used in structures such as mats, papers or cloths. For loose fibers, the sizes may of course vary depending upon the size of particles employed, with the fibers preferably having a length of about 2 to 3 times the particle size. While ceramic fibers may be used with the metal grit, non-metallic and even metallic fibers may also be used. In the case of metallic fibers, the fibers will of course be bonded to the particles, creating a stronger filter, though at a greater cost.

There are several ways in which the fibers may be mixed with the particles. In a first arrangement, shown in FIG. 9, loose fibers 50 may be mixed with the particles, before or after addition of a binder (if a binder is employed). The mixture ratios of particles to fibers may be between about 5% and 95% fibers by weight. The resultant mixture may then be extruded, pressed or compacted as described above. The thus-formed green is then further treated by drying, calcining and/or sintering at metal sintering temperatures, as in the embodiment above. As may be envisioned, mixtures having different particle/fiber ratios and/or particle or fiber sizes and/or fiber compositions are also possible.

Figure 10:
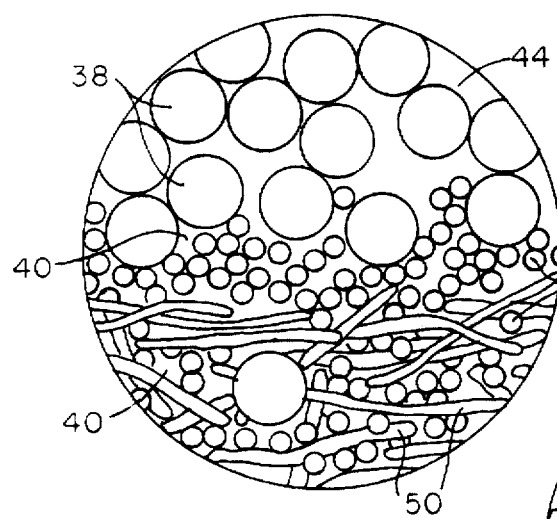
FIG. 10 is an enlarged detail representation of a layered particle/fiber configuration according to the present invention.

A further method of forming a filter with fibers is to infuse the fibers with the particle slurry. For example, a mass of the fibers may be held in a mold, and the particle slurry placed on top of the fibers. Pressing the slurry would then force the particles into the mass of fibers, providing a mixture. In a similar manner, the fibers could be placed into the mold on top of the particles before pressing. In either case a mixture will result. While pressure and other variables are a factor, the uniformity of this mixture will depend, in part, upon the relative particle/fiber ratio. With the proper ratio, there can be a very nearly uniform mixture. With increasing amounts of particles, the fibers may be restricted to one face (e.g., the bottom half of a disk filter). For example, if the fibers are 1" deep in the mold, and 2" of particle slurry is poured on top for pressing and infusing into the fibers, a depth of pure particles will be formed on the upper face of the filter. This is shown in FIG. 10.

This second arrangement may also be used for fiber materials formed in a mat. This is readily apparent for the felt-type mat, and for looser weaves of fibers. For denser weaves and papers, the slurry of particles may not flow through, such that the fiber mat needs to be introduced at a specific point in the process of filling the mold with the particle slurry. For example, a paper formed of ceramic fibers may be inserted into the mold, and the slurry poured in thereafter. Similarly, a portion of slurry could be introduced, the paper laid down, and the remaining slurry poured on top. It is also noted that, due to the relatively small thickness of the paper, more than one layer of the paper may be employed. This may also be true of mats and felts, if they are sufficiently thin with respect to the final filter thickness.

As intimated above regarding different fibers used with metal grit, all possible variations of the subject constituents is possible. For example, ceramic grit may be used with metal fibers, such that the metal fibers bond to trap the ceramic grit in a manner similar to that described above. This arrangement also has similar advantages for strength and low cost. It is of course also possible to have ceramic fibers used with ceramic grit, and metal fibers used with metal grit. The relative mixture ratios for loose fibers with these arrangements would be similar to those noted above. Additionally, the other fiber forms (i.e., felts, mats, papers) could also be used.

The use of non-metal fibers is also envisioned for use with the metal or ceramic grits. Again, the mixture ratios would be similar to those above, and all noted fiber forms may be employed. These embodiments may provide sufficient strength while providing very good cost savings, as at least some of the envisioned non-metal fibers are relatively inexpensive. In most cases the non-metal fibers will be trapped by the sintered grit (either metal or ceramic). With suitable binders, however, it may also be possible to provide at least a moderately strong bond directly between the non-metal fiber and the grit. It is also possible to use mixtures of non-metal fibers and/or fiber forms. For example, a ceramic grit could be poured into a mold over a layer of ceramic paper. Thereafter, a loose mat of kevlar fibers could be laid on top of the ceramic grit and pressed to embed the mat.

As the final remark on this general embodiment, it is also possible to employ the fibers with grits, where the grits are not uniform. An example would be the use of a uniform mixture of large and small ceramic grit together with loose metal fibers. Of course other variations using other grits, fibers, and fiber forms are also possible.

Figure 11:
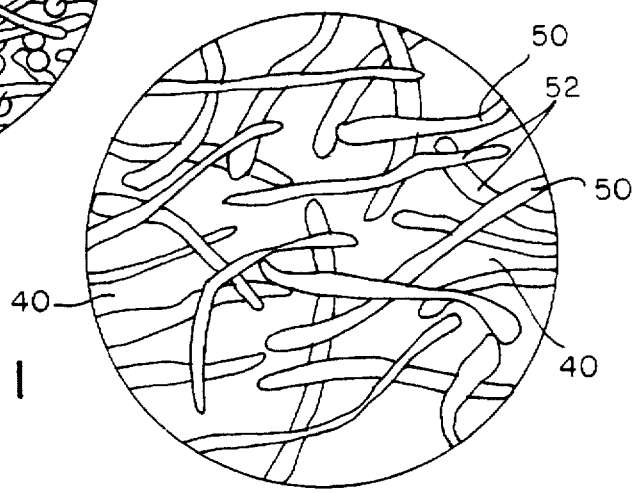
FIG. 11 is an enlarged detail representation of a fiber/fiber configuration according to the present invention.

As the final embodiment, there is the possible use of fibers without grits. This is illustrated in FIG. 11, where first fibers 50 are mixed with second fibers 52. As would be expected from the above discussion, the fibers may be mixtures of metals, ceramic and non-metal, in any possible combination (e.g., metal and ceramic, or metal, ceramic and non-metal, or ceramic and non-metal). As with the embodiments above, if metal fibers are employed the mixture will be sintered at metal temperatures, and the metal fibers will bond to trap the ceramic and/or non-metal fibers. A similar action will occur with the ceramic fibers trapping the non-metal fibers if no metal fibers are used. For these arrangements the relative mixture ratios of fiber types may be anywhere between 1 and 99%, with 40–60% being preferred.

While uniform mixtures of loose fibers may of course be used, it is also possible to employ the other fiber forms. For example, loose metal fibers may be infused into a ceramic fiber mat by pressing. Due to the fiber lengths, it may be more difficult to obtain a uniform infusion, but this may actually be desirable. For example, the ceramic fiber mat may have little or no metal fibers at one face, while the other face includes an infusion of metal fibers, thus reducing the size of passageways through the filter. As above, it is also possible to use mixtures of loose fibers together with the other fiber forms. For example, ceramic and non-metal fibers may be uniformly mixed and then pressed upon a ceramic paper.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims. Specifically, the possible combinations between ceramic, metal and non-metal constituents are intended to be within the scope of this invention, even though not specifically enumerated in the interest of brevity.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A unitary filter for use with an inflator comprising:
   a monolithic reticulated porous body having sufficient strength, porosity and filtering characteristics for use as a filter for gasses produced by a pyrotechnic inflator, said body being formed as an agglomeration of (1) first particles having a first size, and (2) second particles having a second size which is appreciable different from said first size, and wherein said body is sized and shaped to form a portion of an outer wall of the inflator.

2. A unitary filter as in claim 1, for use with an inflator, comprising:
   a monolithic reticulated porous body having sufficient strength, porosity and filtering characteristics for use as a filter for gasses produced by a pyrotechnic inflator, said body being formed as an agglomeration of (1) first particles having a first size, and (2) second particles having a second size which is appreciably different from said first size, wherein said first size is large, being within the range of about 1.35–0.70 mm, and said second size is small, being within the range of about 0.75–0.3 mm.

3. A filter as in claim 2, wherein said first particles are formed of metal, and said second particles are formed of ceramic.

4. A filter as in claim 2, wherein said first particles are formed of metal and said second particles are formed of metal.

5. A filter as in claim 2, wherein said first particles are formed of ceramic, and said second particles are formed of ceramic.

6. A filter as in claim 2, wherein said first particles are formed of ceramic, and said second particles are formed of metal.

7. A filter as in claim 2, wherein said first and said second particles are uniformly distributed throughout said body of said filter.

8. A filter as in claim 2, wherein said first particles form a first layer of said body, and said second particles form a second layer of said body, said first and said second layers being directly adjacent, and wherein said first particles and said second particles are intermingled at the intersection of said layers.

9. A filter as in claim 8, wherein each of said layers is formed as an individual element, and thereafter said individual elements are forced together to form said body and cause said intermingling.

10. A unitary filter for use with an inflator, comprising:
a monolithic reticulated, porous body having sufficient strength, porosity and filtering characteristics for use as a filter for gasses produced by a pyrotechnic inflator, said body being formed as an agglomeration of (1) first particles having a first size, and (2) second particles having a second size which is appreciably different from said first size, wherein said first size is large, being within the range of about 1.35–0.70 mm, and wherein said second size is very small, being within the range of about 0.075–0.03 mm.

11. A filter as in claim 10, wherein said first particles are formed of metal, and said second particles are formed of ceramic.

12. A filter as in claim 10, wherein said first particles are formed of metal and said second particles are formed of metal.

13. A filter as in claim 10, wherein said first particles are formed of ceramic, and said second particles are formed of ceramic.

14. A filter as in claim 2, wherein said first particles are formed of ceramic, and said second particles are formed of metal.

15. A filter as in claim 10, wherein said first and said second particles are uniformly distributed throughout said body of said filter.

16. A filter as in claim 10, wherein said first particles form a first layer of said body, and said second particles form a second layer of said body, said first and said second layers being directly adjacent, and wherein said first particles and said second particles are intermingled at the intersection of said layers.

17. A filter as in claim 16, wherein each of said layers is formed as an individual element, and thereafter said individual elements are forced together to form said body and said intermingling.

* * * * *